(12) United States Patent
Bakker

(10) Patent No.: US 6,827,108 B2
(45) Date of Patent: Dec. 7, 2004

(54) SINGLE WIRE CABLE CONDUIT

(75) Inventor: Emile A. M. Bakker, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 121 days.

(21) Appl. No.: 10/292,058

(22) Filed: Nov. 12, 2002

(65) Prior Publication Data

US 2004/0089362 A1 May 13, 2004

(51) Int. Cl.[7] .................................................. F16L 11/00
(52) U.S. Cl. ....................... 138/118; 138/134; 138/108; 29/435; 72/371
(58) Field of Search ................................. 138/134, 129, 138/108, 118; 74/502.5; 464/174; 72/368, 137, 371; 29/435, 828

(56) References Cited

U.S. PATENT DOCUMENTS

| | | | | |
|---|---|---|---|---|
| 434,748 A | * | 8/1890 | Almond | 138/134 |
| 787,904 A | * | 4/1905 | Dring | 74/502.5 |
| 1,053,394 A | * | 2/1913 | Hubbell | 464/174 |
| 1,179,577 A | * | 4/1916 | Sundh | 138/122 |
| 1,746,719 A | * | 2/1930 | Sneed | 74/502.5 |
| 1,941,151 A | * | 12/1933 | Nigro | 138/134 |
| 1,959,692 A | * | 5/1934 | Sneed | 74/502.5 |
| 1,981,950 A | * | 11/1934 | Dodge | 72/368 |
| 2,086,263 A | * | 7/1937 | Fischer | 138/134 |
| 2,087,373 A | * | 7/1937 | Dodge | 464/174 |
| 3,180,365 A | * | 4/1965 | Peterson | 138/134 |
| 3,214,995 A | * | 11/1965 | Gilmore | 74/502.5 |
| 3,261,225 A | * | 7/1966 | Crouse | 74/502.5 |
| 6,668,680 B1 | | 12/2003 | Freund et al. | 74/512 |

* cited by examiner

Primary Examiner—Patrick Brinson
(74) Attorney, Agent, or Firm—Thomas A. Jurecko

(57) ABSTRACT

A single wire cable conduit provided having a rhomboid-shaped wire including approximately parallel sides, a rounded first end, and a tapered second end. The wire is serpentine wound into a hollow tubular body having a plurality of approximately parallel adjoining wire loops. The wire loops each have the rounded first end positioned in continuous displaceable contact with the tapered second end of an adjacent loop. As the hollow tubular body deflects, each wire loop displaces relative to its adjacent wire loop. Each rounded first end is able to rotate and translate along the abutting tapered second end reducing both conduit bending resistance and potential friction damage to either a sleeve or cable and to a jacket covering the hollow tubular body.

10 Claims, 9 Drawing Sheets

SINGLE WIRE CABLE CONDUIT

FIELD OF THE INVENTION

The present invention relates to cable conduits and, more specifically, to flexible, semi-concentric cable conduits constructed of a single wire.

BACKGROUND OF THE INVENTION

Conduits are used to protect and route actuation cables between service locations in a variety of applications. As defined herein, conduits are at least one wire, serpentine wound to a predetermined diameter, forming successive wire loops (or segments) wherein the wire of each loop abuts a wire in each successive loop, and a plurality of the wire loops form a hollow, flexible, tubular body.

A single-wire conduit system uses a serpentine-wound single wire, that in cross section has a generally rectangular shape. The wire winding loops abut each other when the conduit is in a straight or non-flexed position. The conduit is normally provided with a protective external jacket of a flexible, usually fluid-resistant material. A flexible, braided wire or cable (hereafter referred to as a cable) is normally run through the center of the conduit and extends from either end of the conduit. The cable is normally attached to an actuation device on a first end and to the item to be actuated on a cable second end. In many applications, a plastic, cylindrically shaped sleeve is disposed within the circular inner diameter of the conduit hollow tubular body to surround the cable.

A drawback of prior single-wire conduit results when bending the conduit. In cross section, the hollow, tubular body when bent forms an inside radial wall and an outside radial wall. The rectangular shaped conduit wire on the outside radial wall deflects creating gaps between successive coils. The forces required to flex the coils create or increase resistance to conduit bending. The gaps created between successive coils also create friction at the plastic sleeve interface and at the jacket interface which can damage the sleeve or jacket.

Known two-wire conduits have two primary disadvantages. First, addition of a second, round wire adds an additional material cost to the conduit system. Second, the round wire adds complexity to the manufacture of the conduit system, in that the round wire must be position controlled when wound into the conduit.

A need therefore exists for a single-wire conduit and conduit system that minimizes potential bending damage and the cable friction damage caused by known single-wire conduits when bent.

SUMMARY OF THE INVENTION

According to one aspect of the present invention, a conduit is formed by a wire circularly formed into a plurality of continuously abutted loop pairs. In cross section, the wire has a modified rhomboid shape cross section having approximately parallel sides, a rounded first end and a tapered second end. The plurality of continuously abutted loop pairs are continuously stackable forming a hollow tubular body having a centerline. The hollow tubular body is deformable in an arc about the centerline such that the rounded first end of the wire is both rotatable and translatable along the tapered second end of the wire in each loop pair.

In another aspect of the present invention, a method is provided to form a single-wire conduit. The method comprises the steps of (1) selecting a metal strip having a cross sectional shape having approximately parallel sides, a rounded first end and a tapered second end; (2) serpentine winding the metal strip into a hollow tubular body having a plurality of wire loops combining to form approximately parallel abutting wire loop pairs; and (3) aligning the metal strip such that the rounded first end is in continuous, displaceable contact with the tapered second end for each wire loop pair.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description is merely exemplary in nature and is in no way intended to limit the invention, its application, or uses.

Figure 1:
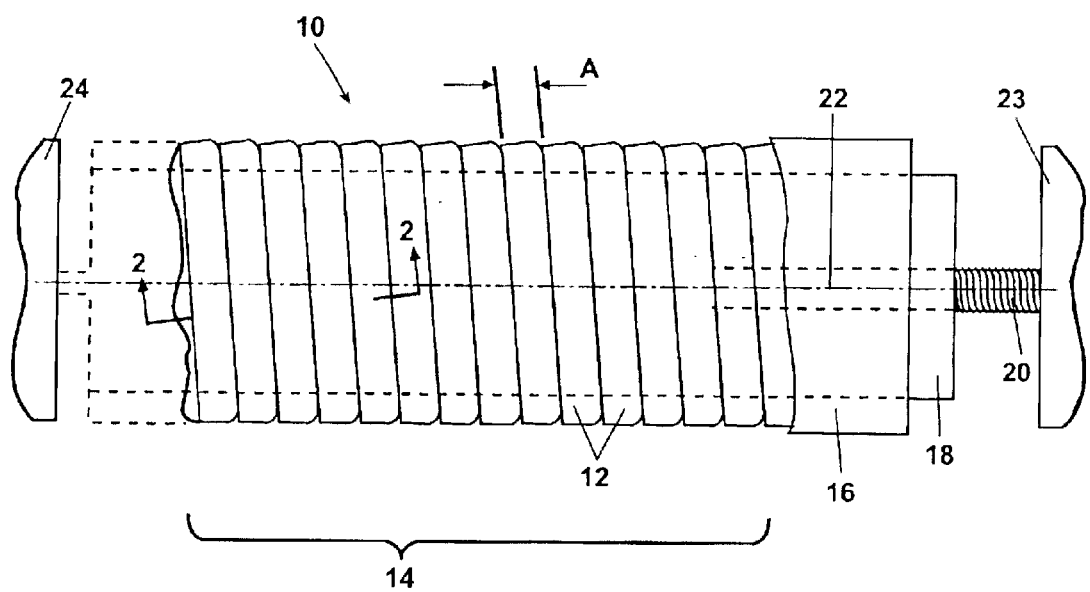
FIG. 1 is a side elevation view of a single-wire conduit of the present invention.

Referring to FIG. 1, a single-wire conduit 10 according to a preferred embodiment of the present invention is shown. The single-wire conduit 10 includes a wire 12, that in cross section has a modified rhomboid shape defined herein as a cross sectional shape having approximately parallel sides, a rounded first end in place of one a rhomboid's normally tapered ends, and a tapered second end. The wire 12 is serpentine wound into a hollow tubular body 14. The hollow tubular body 14 is formed by abutting adjacent loops of the wire 12 at a wire pitch A. The hollow tubular body is surrounded by a continuous jacket 16. The continuous jacket 16 normally includes a fluid-resistant polymeric material that is capable of multiple deflections without yielding the plastic material.

In the exemplary preferred embodiment shown, a sleeve 18 is provided within the hollow tubular body 14 such that the sleeve 18 has a central aperture within which a cable 20 is slidably disposed along a body longitudinal centerline 22. The sleeve 18 includes a flexible material capable of multiple deflections without yielding the sleeve material. A polymeric material is preferred for the sleeve 18 for flexibility and to reduce friction for the cable 20. The cable 20 is normally a stranded metallic wire that provides increased strength and flexibility for the cable 20. The cable 20 can also be provided as a single or continuous length of circular wire. Material for the cable 20 is normally a steel material, however other materials such as other metals and polymers can be substituted for the cable 20. The cable 20 has a longitudinal strength such that either a tensile (i.e., pulling) force or a compressive (i.e., pushing) force can be applied to the cable 20 to transfer a load between an actuator 23 and an operated device 24 without yielding, shearing or buckling the cable 20. The cable 20 is sized-as known in the art depending on several factors including: the total force required to be transferred; the flexibility desired in the conduit; the number of flex cycles required, and the minimum bend radius required for the conduit.

Figure 2:
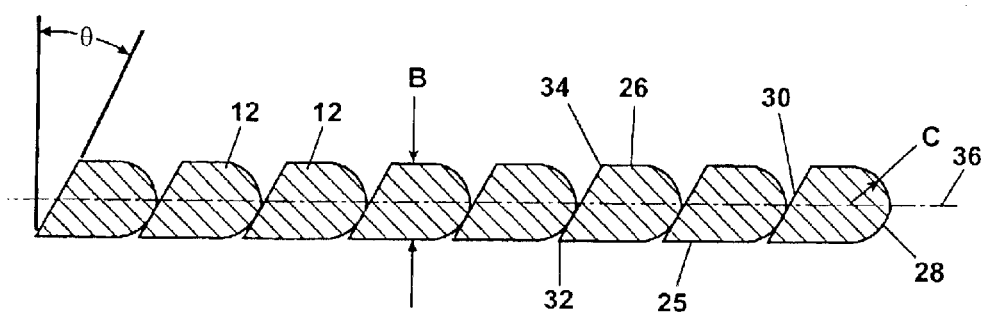
FIG. 2 is a partial section view taken along Section 2—2 of FIG. 1 showing the modified rhomboid-shaped wire of the present invention.

Referring to FIG. 2, a partial section view of the hollow tubular body 14 of FIG. 1 is shown in greater detail. The wire 12 includes an acute side 25 and an obtuse side 26. The acute side 25 and the obtuse side 26 are approximately parallel to each other. The wire 12 also includes a rounded first end 28 and a tapered second end 30. The tapered second end 30 has a taper angle theta (θ) that normally ranges between approximately 35 to approximately 45 degrees. Also shown is a wire thickness B, and a wire end radius C.

When the hollow tubular body 14 is in a straight condition such as shown in FIG. 1, each rounded first end 28 is in a displaceable contact position with an adjacent tapered second end 30. An acute corner 32 is formed between the acute side 25 and the tapered second end 30. The acute corner 32 is normally slightly rounded to facilitate production of the wire 12. An obtuse corner 34 is provided between each of the obtuse sides 26 and the tapered second end 30. Similar to the acute corner 32, the obtuse corner 34 is also slightly rounded to facilitate production. Each section of the wire 12 shown includes an individual wire centerline 36. In the configuration when the wire 12 is straight as shown, each of the individual wire centerlines 36 align on a common centerline.

Figure 3:
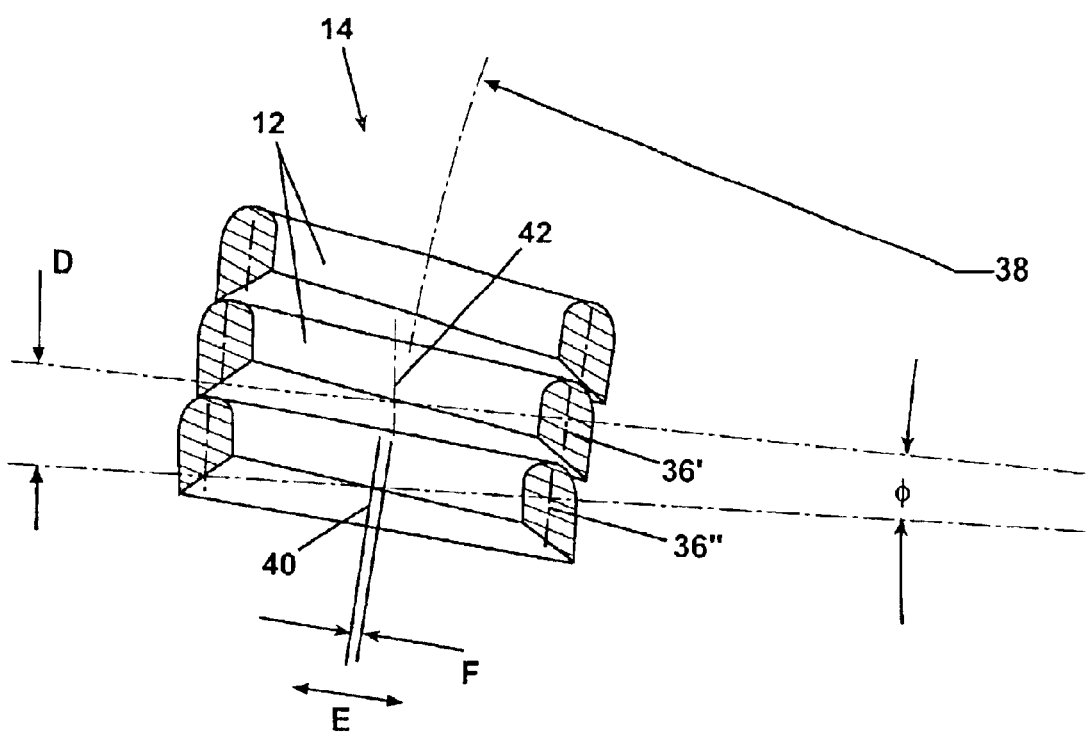
FIG. 3 is a partial section view of a single wire conduit of the present invention showing a plurality of modified rhomboid-shaped wires and their relative displacement as the single-wire conduit of the present invention is bent about a radius of curvature.

Referring to FIG. 3, a portion of the hollow tubular body 14 is shown after it is bent about a conduit bend radius 38. A first tubular body midpoint 40 of a first exemplary segment of the wire 12 and a second tubular body midpoint 42 of a second exemplary segment of the wire 12 provide exemplary midpoints indicating a radial translation of the wire 12 between loop pairs or bent segments. Each successive loop pair of the wire 12 is separated by a wire spacing D. As the hollow tubular body 14 is bent, individual wire loops of the wire 12 translate in a wire translation direction E. The total translation along wire translation direction E between individual wire loops is shown as a translation distance F separating the first tubular body midpoint 40 from the second tubular body midpoint 42. The wire spacing D is also measurable by a separation angle phi (φ).

As the hollow tubular body 14 is bent, the wire centerline 36 shown in FIG. 2 also changes due to a relative rotation between individual wire loops of the wire 12. This is exemplified in FIG. 3 by the difference between a wire centerline 36' and a wire centerline 36". This wire centerline shift will be further discussed in reference to FIGS. 4 through 7.

Figure 4:
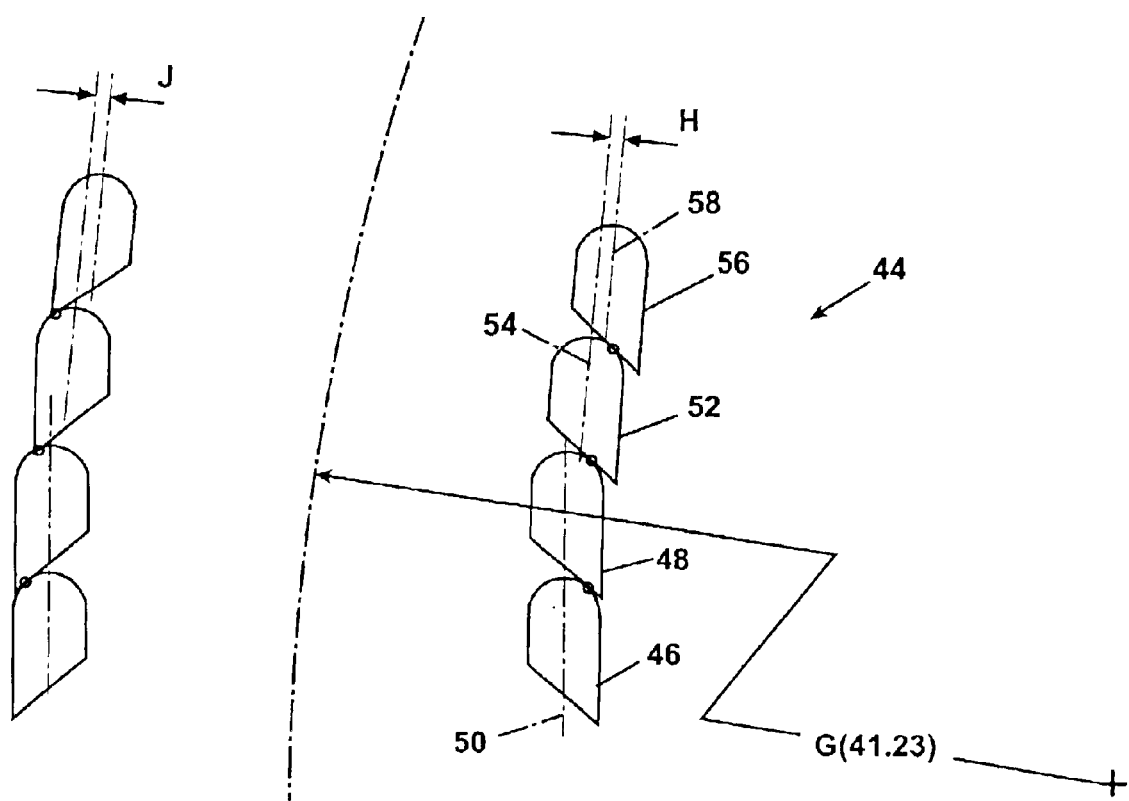
FIG. 4 is a partial section view of the modified rhomboid-shaped wires of the present invention showing a transverse coil shift when the conduit is bent about a radius of curvature.

Referring now to FIG. 4, a transverse shift is detailed for wire segments bent about a radius of curvature G. In the exemplary case shown, the radius of curvature G is approximately 41.23 mm for a wire segment having an exemplary hollow tubular body outer diameter of approximately 8 mm, and a wire width S (see FIG. 8) of approximately 1 mm. A conduit segment 44 is shown having an exemplary four wire segments indicated. A wire segment 46 and a wire segment 48 are shown having a common wire centerline 50. A wire segment 52 having a wire centerline 54 and a wire segment 56 having a wire centerline 58 are also shown. Both the wire segment 52 and the wire segment 56 are shown after bending about the bend radius G. A transverse shift dimension H results between the wire centerline 54 and the wire centerline 58. In this exemplary case, the transverse shift dimension H is approximately 0.22 mm. A transverse shift dimension J is also shown for the opposed or outside wall of the bend. For this exemplary case, the transverse shift dimension J is approximately 0.21 mm.

Figure 5:
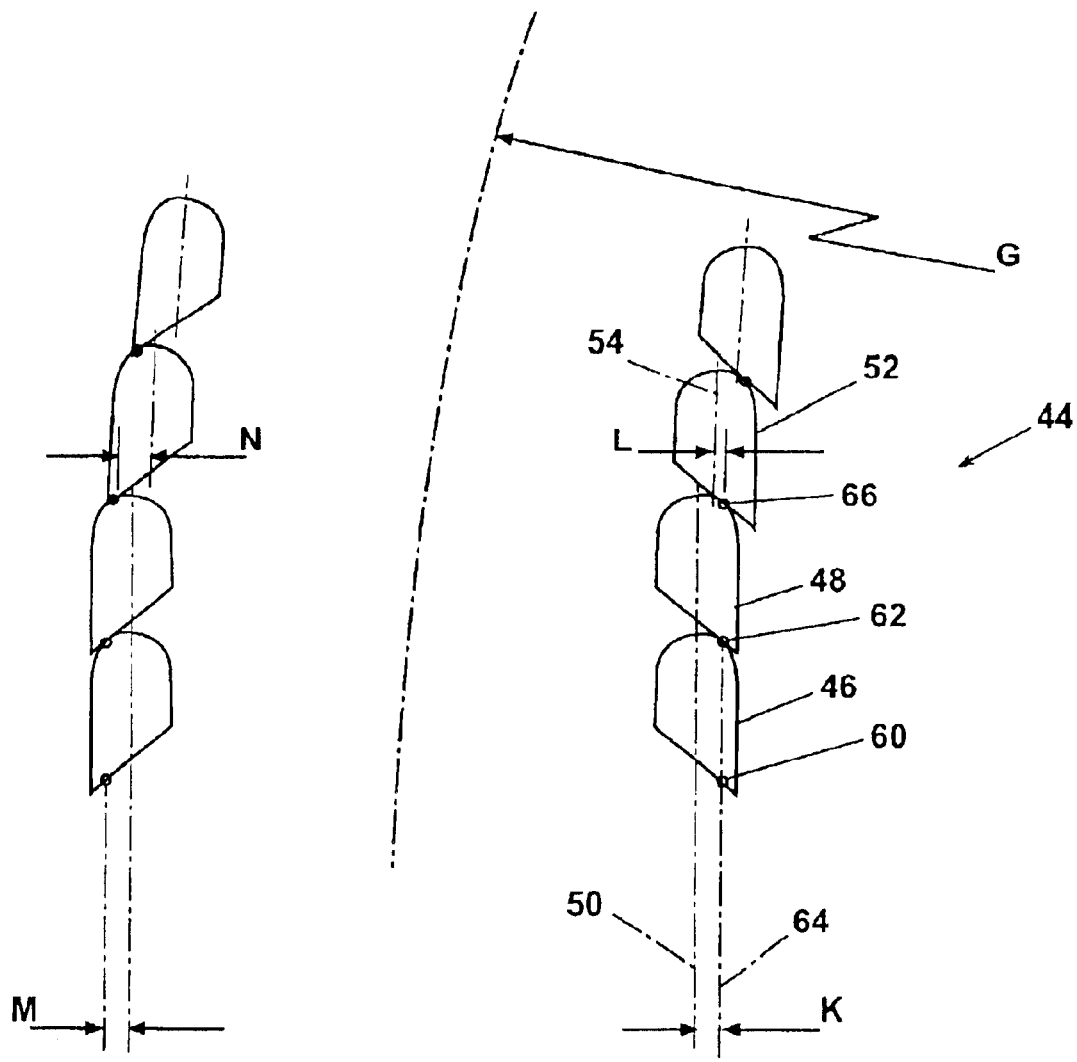
FIG. 5 is a partial section view similar to FIG. 4, showing a contact point shift when the conduit is bent about a radius of curvature.

Referring to FIG. 5, the relative displacement between contact points of adjoining wire segments is shown. The wire segment 46 and the wire segment 48 are co-aligned on the wire centerline 50. A contact point 60 for the wire segment 46 is shown between the wire segment 46 and an upstream wire segment (not shown). A contact point 62 between the wire segment 46 and the wire segment 48 is also shown. The contact point 60 and the contact point 62 are co-aligned on a contact point centerline 64. A nominal contact point spacing K results between the wire centerline 50 and the contact point centerline 64 for those wire segments which are in the straight or unbent position. In the exemplary case shown, the nominal contact point spacing K is approximately 0.32 mm. Between the wire segment 48 and the adjoining wire segment 52, a contact point 66 is formed. A modified contact point spacing L results between the wire centerline 54 of the wire segment 52 and the contact point 66. In the exemplary case shown, the modified contact point spacing L is approximately 0.13 mm. The difference in the contact point spacing between the nominal contact point spacing K and the modified contact point spacing L further exemplifies the displacement of the wire segment 52 as the conduit segment 44 is bent about the bend radius G. FIG. 5 also shows on the outside wall of the bend that an outside wall contact point spacing M exists for the straight segment of the wire segments. A modified outside wall contact point spacing N indicates an increasing relationship between the contact point and the wire segment centerline on the outside wall of the bend. In the exemplary case shown, the outside wall contact point spacing M is approximately 0.32 mm and the modified outside wall contact point spacing N is approximately 0.43 mm.

Figure 6:
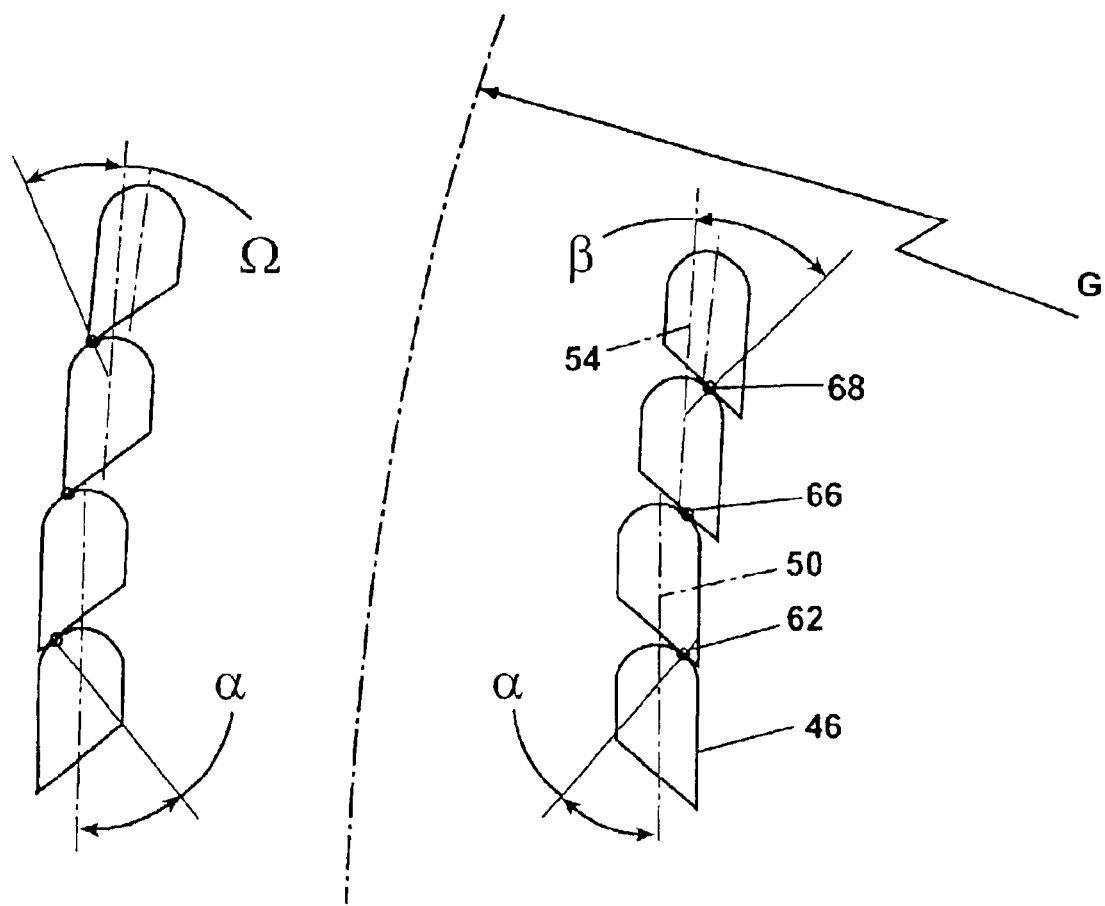
FIG. 6 is a partial section view similar to FIG. 4, showing a contact point rotation angle shift when the conduit is bent about a radius of curvature.

Referring to FIG. 6, a wire segment rotation about the contact point is indicated for wire segments as they bend about the bend radius G. An angle α represents the angle between the wire centerline 50 and the position of the contact point 62 about the rounded first end of the wire segment 46. The contact point locating angle increases to the angle β for a contact point 68 relative to the wire centerline 54. In the exemplary case shown, the angle α is approximately 40 degrees and the angle β increases to approximately 42.5 degrees. For the outside bend wall shown in FIG. 6, the rotation about the contact points decreases as the outside bend is formed about the bend radius G. An angle Ω decreases to approximately 27.4 degrees compared to the angle α of approximately 40 degrees for the exemplary case shown in FIG. 6.

Figure 7:
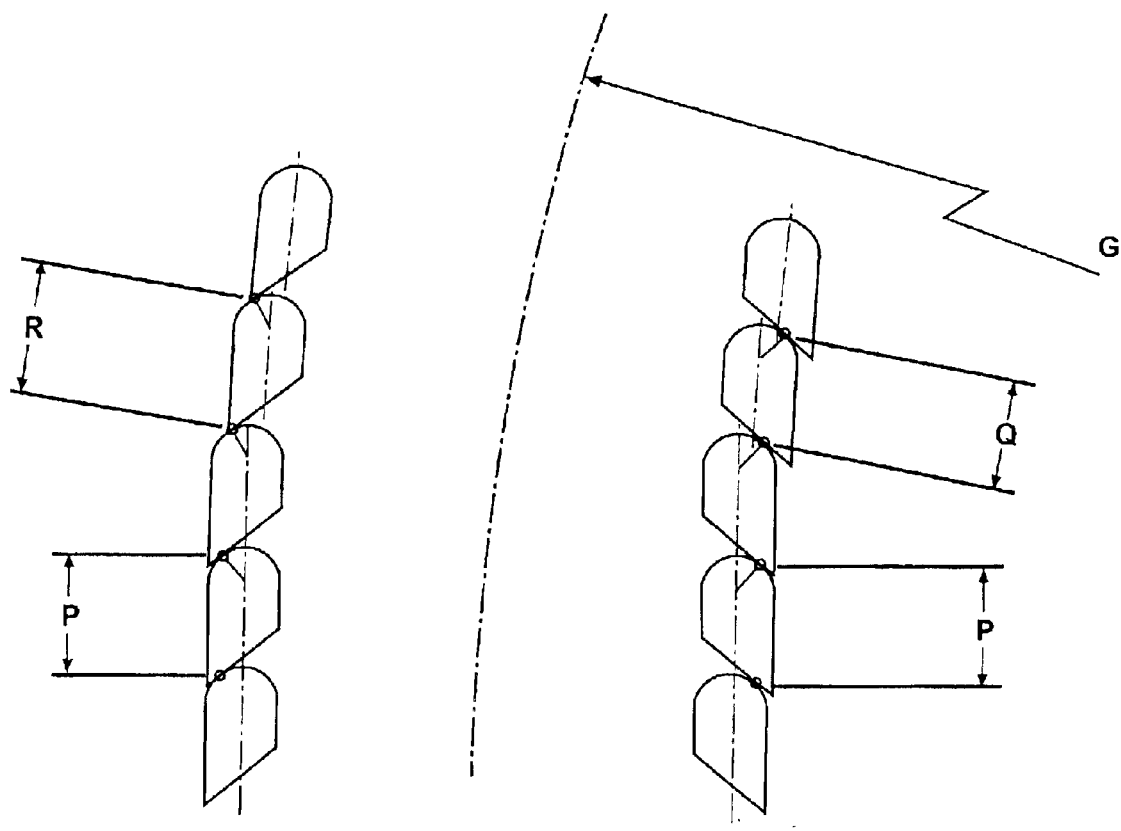
FIG. 7 is a partial section view similar to FIG. 4, further showing an effective length change between wire segments when the conduit is bent about a radius of curvature.

Referring to FIG. 7, as the wire segments are formed about the bend radius G, an effective length between each of the contact points of adjoining wire segments changes. For the inside wall, a length in the straight condition P is shown between adjacent contact points. Between wire segments in the section of the bend, the effective length Q results between contact points. For the exemplary case shown in FIG. 7, the length in the straight condition P is approximately 1.73 mm and the effective length Q of the wire segment after bending reduces to approximately 1.58 mm. The opposite effect takes place on the outside wall. The effective length R on the outside wall is approximately 1.89 mm after bending compared to the length in the straight condition P of approximately 1.73 mm. FIG. 7 therefore represents that along the inside wall spacing between the wire segment contact points will decrease and along the outside wall spacing between the wire segment contact points will increase while maintaining contact between each of the adjacent wire segments.

Figure 8:
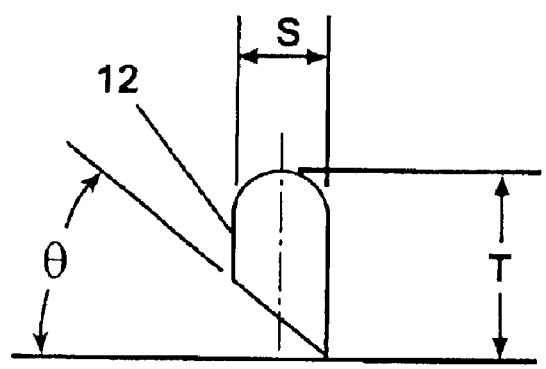
FIG. 8 is single segment section of one preferred embodiment of a conduit of the present invention.

Referring to FIG. 8, a preferred embodiment of the present invention is shown for an individual section of the wire 12. The exemplary wire 12 includes a width S and a height T.

Figure 9:
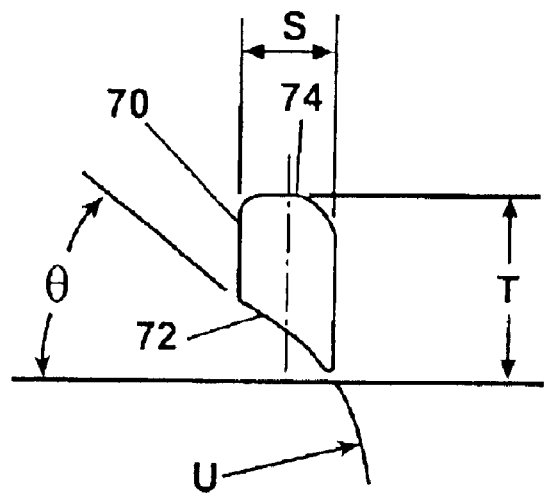
FIG. 9 is single segment section of another preferred embodiment of a conduit of the present invention.

Referring now to FIG. 9, another preferred embodiment of the present invention for a modified rhomboid-shaped wire 70 is shown. The modified rhomboid-shaped wire 70 also includes a width S and a height T similar to the wire 12 shown in FIG. 8. The modified rhomboid-shaped wire 70 also includes a radius U along a tapered second end 72. A rounded first end 74 of the modified rhomboid-shaped wire 70 also differs from the rounded first end 28 (shown in FIG. 2) of the wire 12 by including different radii for each of the individual rounded corners of the modified rhomboid-shaped wire 70.

Figure 10:
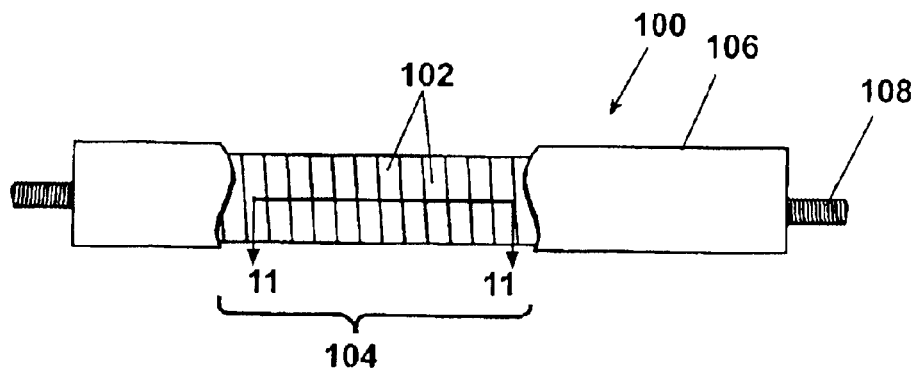
FIG. 10 is a side elevation view of a single-wire conduit known in the art.

Referring to FIG. 10, a common design for a single-wire conduit 100 is shown. The single-wire conduit 100 includes a rectangular shaped wire 102, which is continuously wound to form a hollow tubular body 104. A continuous jacket 106 surrounds the hollow tubular body 104. A cable 108 is passed through approximately the center of the single-wire conduit 100 and extends distally outward from either end of the single-wire conduit 100.

Figure 11:
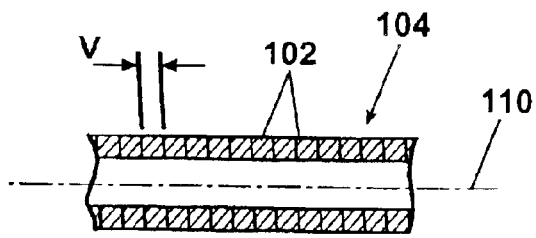
FIG. 11 is a partial section view taken through Section 11 of FIG. 10 showing the common rectangular-shaped wire used to form the single-wire conduit of FIG. 10.

Referring to FIG. 11, the hollow tubular body 104 is shown in greater detail in a partial cross section taken from FIG. 10. The rectangular shaped wire 102 is serpentine wound into a plurality of adjacent abutting wire segments that have a pitch V. The rectangular shaped wire 102 is wound about a body longitudinal centerline 110.

Figure 12:
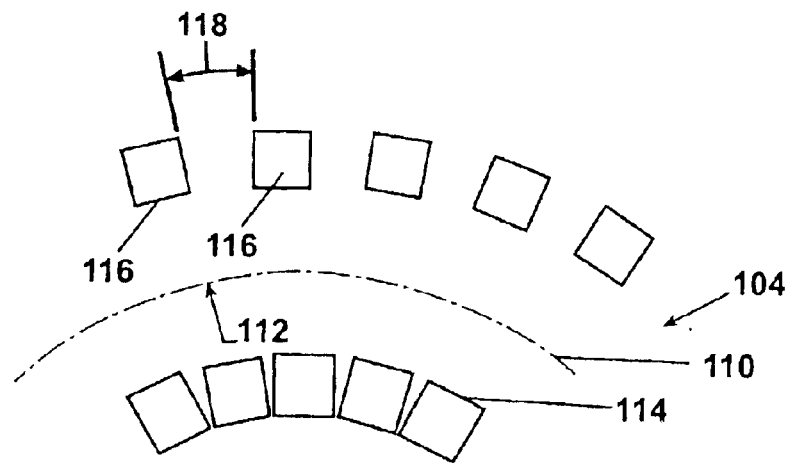
FIG. 12 is an exploded partial section view taken from FIG. 11 further showing the deflection of the individual wires of a hollow, tubular body formed by the individual wires as the hollow tubular body is bent about a bend radius.

Referring to FIG. 12, the hollow tubular body 104 of FIG. 11 is shown following a radial bending along the body longitudinal centerline 110. The hollow tubular body 104 is bent using a conduit bend radius 112. By bending the hollow tubular body 104, an inner conduit wall 114 and an outer conduit wall 116 are formed within which the cable 108 shown in FIG. 10 is disposed. The outer conduit wall 116 forms a plurality of wire gaps 118. The wire gaps 118 increase resistance to bending of the hollow tubular body 104, and by displacing circumferentially cause friction surfaces that can damage the cable 108 as it translates through the hollow tubular body 104, or can damage the continuous jacket 106.

Figure 13:
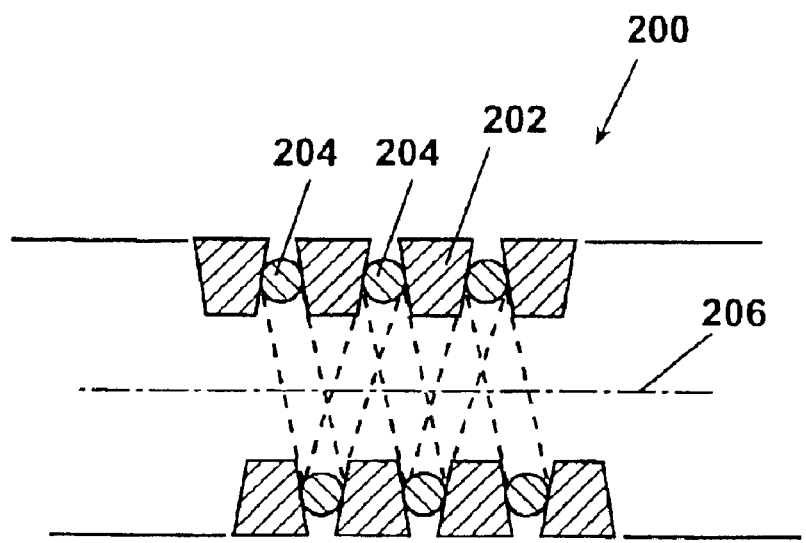
FIG. 13 is a partial section view similar to FIG. 11 of an alternate embodiment employing a rounded wire between trapezoidal-shaped wires to form the hollow tubular body of a common two-wire conduit.

Referring now to FIG. 13, a two-wire conduit 200 known in the art is shown. The two-wire conduit 200 includes a trapezoid-shaped wire 202 and a circular wire 204. Both the trapezoid-shaped wire 202 and the circular wire 204 are bent about a common body longitudinal centerline 206. The circular wire 204 is disposed between individual angled surfaces of the trapezoid-shaped wire 202. In the non-deflected position shown in FIG. 13, the circular wire 204 is normally positioned about central to the height of the trapezoid-shaped wire 202.

Figure 14:
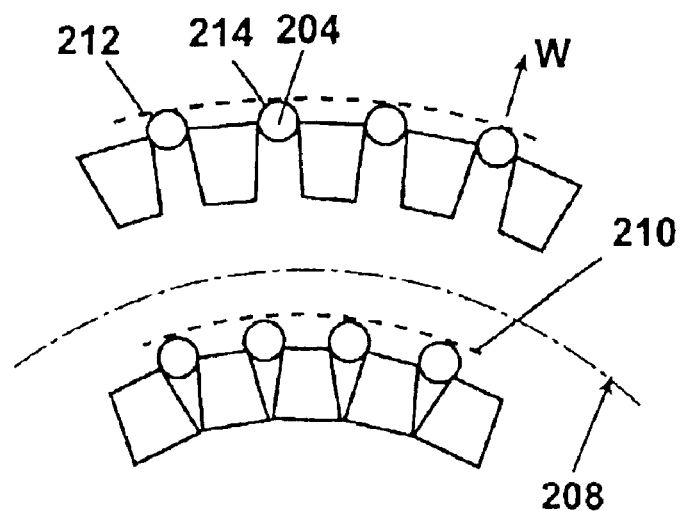
FIG. 14 is an exploded partial section view taken from FIG. 13 further showing the relative displacement of the rounded wire of the two-wire conduit as the hollow tubular body is bent about a bend radius.

Referring to FIG. 14, the two-wire conduit 200 of FIG. 13 is shown following bending. The two-wire conduit 200 is bent about a conduit bend radius 208. When bent as shown, the circular wire 204 translates outward in the circular wire displacement direction W as shown. An inner conduit wall 210 is formed by the circular wire 204. An outer conduit wall 212 is formed by a plurality of outer faces 214 of the circular wire 204. Frictional forces generated by bending the two-wire conduit 200 are decreased relative to the jacket (not shown) of the two-wire conduit 200 compared to the frictional forces generated by bending the single-wire conduit 100 shown in FIG. 10 against the continuous jacket 106. The frictional forces are reduced for the two-wire conduit 200 at the expense of adding the circular wire 204.

FIGS. 10 to 14 identify single wire and two-wire conduit systems commonly known in the art.

The single-wire conduit of the present invention offers several advantages. By providing the modified rhomboid-shaped wire of the present invention, and abutting the rounded first end to an adjacent tapered second end, a bend in the single-wire conduit can be accommodated without presenting sharp edges or sharp corners to a cable passed through the single-wire conduit. When bent, the single-wire conduit of the present invention generally provides a rounded exposed surface upon which either the cable passing through the single-wire conduit or the combination of a cable within a sleeve will contact. This reduces friction within the conduit, a result similar to that provided by the circular-wire, two-wire conduit system known in the art. With appropriate sizing, a cable can be passed through the hollow tubular body of the single-wire conduit of the present invention using a sleeve or by eliminating the sleeve and having the cable passed directly along the modified, rhomboid-shaped wire of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A conduit comprising:
   a wire having a modified rhomboid-shaped cross section including approximately parallel sides, a rounded first end, and a tapered second end;

said wire being circularly formed into a plurality of continuously abutted loop pairs, each said loop pair having said rounded first end disposed in continuous displaceable contact with a tapered second end of an adjacent loop; and said plurality of continuously abutted loop pairs being continuously stackable forming a hollow tubular body having a body centerline;

wherein said hollow tubular body is deformable in an arc about said body centerline such that said rounded first end of said wire is both rotatable and translatable along said tapered second end of said wire in each said loop pair.

2. The conduit of claim 1, wherein said wire comprises a metal material.

3. The conduit of claim 1, wherein said wire comprises a nonmetallic material.

4. The conduit of claim 1, further comprising:

a hollow cylindrically shaped sleeve being internally disposed within said hollow tubular body in contact with an inside perimeter thereof and adapted to receive a cable slidably disposed therein.

5. The conduit of claim 4, wherein said hollow cylindrically shaped sleeve comprises a plastic material.

6. The conduit system of claim 4, wherein an outside perimeter of the hollow tubular body is externally sealed by a continuous jacket.

7. The conduit system of claim 6, wherein said continuous jacket comprises a flexible fluid resistant material.

8. A method of forming a single-wire conduit system comprising the steps of:

providing a strip element having a cross sectional shape including approximately parallel sides, a rounded first end, and a tapered second end;

serpentine winding said strip element into a hollow tubular body having a plurality of wire loops combining to form approximately parallel abutting wire loop pairs; and aligning said strip element such that said rounded first end is in continuous displaceable contact with a tapered second end of an adjacent loop for each said wire loop pair.

9. The method of claim 8, comprising slidably disposing a cable within said hollow tubular body.

10. The method of claim 9, comprising:

disposing a flexible tubular sleeve into said hollow tubular body;

positioning said cable within a centrally disposed aperture of said flexible tubular sleeve; and circumferentially disposing a flexible jacket about said hollow tubular body.

* * * * *